US008274365B2

(12) United States Patent
Piccirillo et al.

(10) Patent No.: US 8,274,365 B2
(45) Date of Patent: Sep. 25, 2012

(54) SMART LOCK SYSTEM

(75) Inventors: James S. Piccirillo, Middletown, CT (US); Wayne J. Hooper, Clinton, CT (US); Christopher E. Lamourine, Columbia, CT (US); David A. Yudelson, Burlington, CT (US)

(73) Assignee: The Eastern Company, Naugatuck, CT (US)

( * ) Notice: Subject to any disclaimer, the term of this patent is extended or adjusted under 35 U.S.C. 154(b) by 1156 days.

(21) Appl. No.: 12/102,341

(22) Filed: Apr. 14, 2008

(65) Prior Publication Data

US 2009/0256676 A1 Oct. 15, 2009

(51) Int. Cl.

| | |
|---|---|
| ***G05B 19/00*** | (2006.01) |
| ***B60R 25/00*** | (2006.01) |
| ***G05B 23/00*** | (2006.01) |
| ***G06F 7/00*** | (2006.01) |

(52) U.S. Cl. ........ 340/5.6; 340/5.7; 340/5.73; 340/5.74; 340/5.8

(58) Field of Classification Search .................. 340/5.6, 340/5.73, 5.74, 5.8, 5.7

See application file for complete search history.

(56) References Cited

U.S. PATENT DOCUMENTS

| | | | | |
|---|---|---|---|---|
| 4,916,443 | A * | 4/1990 | Barrett et al. | 340/5.33 |
| 4,988,987 | A | 1/1991 | Barrett et al. | |
| 6,047,575 | A | 4/2000 | Larson et al. | |
| 6,081,199 | A | 6/2000 | Hogl | |
| 6,442,983 | B1 | 9/2002 | Thomas et al. | |
| 6,474,122 | B2 | 11/2002 | Davis | |
| 6,604,394 | B2 | 8/2003 | Davis | |
| 6,615,625 | B2 | 9/2003 | Davis | |
| 6,792,779 | B1 | 9/2004 | Shen | |
| 6,895,792 | B2 | 5/2005 | Davis | |
| 6,989,732 | B2 | 1/2006 | Fisher | |
| 7,009,489 | B2 | 3/2006 | Fisher | |
| 7,021,092 | B2 | 4/2006 | Loughlin et al. | |
| 7,178,369 | B2 | 2/2007 | Azzalin et al. | |
| 7,193,503 | B2 * | 3/2007 | Fisher | 340/5.73 |
| 7,209,029 | B2 * | 4/2007 | Coelho et al. | 340/5.26 |

(Continued)

FOREIGN PATENT DOCUMENTS

GB 2 144 483 A 3/1985

OTHER PUBLICATIONS

CyberLock Information, Videx-CyberLock Product Detail Page, Sep. 12, 2007. p. 1 of 4.

(Continued)

*Primary Examiner* — Benjamin C Lee
*Assistant Examiner* — Christopher Gaines
(74) *Attorney, Agent, or Firm* — McCormick, Paulding & Huber LLP

(57) ABSTRACT

An electronic access control and recording system includes a lock, a card reader, a key card configured to communicate with the lock and with the card reader, a database, and an administrator microprocessor configured to provide a user interface and to communicate with the database and with the card reader. At least one of the lock and the card contain a microprocessor and a non-volatile memory storing encrypted information. In use, the key card provides access to the lock and transfers the encrypted information between the lock and the database via the card reader and the administrator microprocessor. The administrator microprocessor provides a user interface for reviewing and administering the database. The user interface also provides account and password qualification for users.

9 Claims, 9 Drawing Sheets

U.S. PATENT DOCUMENTS

| | | | | |
|---|---|---|---|---|
| 7,847,675 | B1 * | 12/2010 | Thyen et al. | 340/5.2 |
| 2002/0014950 | A1 * | 2/2002 | Ayala et al. | 340/5.6 |
| 2003/0179075 | A1 | 9/2003 | Greenman | |
| 2004/0083374 | A1 * | 4/2004 | Sugawara | 713/189 |
| 2005/0051621 | A1 | 3/2005 | Wong et al. | |
| 2005/0132764 | A1 | 6/2005 | Loughlin et al. | |
| 2005/0210932 | A1 | 9/2005 | Azzalin et al. | |
| 2008/0012690 | A1 * | 1/2008 | Friedrich | 340/10.1 |

OTHER PUBLICATIONS

Welcome to Videx!, Videx-Access Control and Data Collection, Sep. 12, 2007. p. 1 of 1.

* cited by examiner

Setup Card

SMART LOCK SYSTEM

FIELD OF THE INVENTION

The present invention relates to systems and devices for access control and, more particularly, to electronic key systems and devices for access control and monitoring.

BACKGROUND OF THE INVENTION

Traditional key padlocks or programmable mechanical locksets have been used to secure areas including buildings, rooms and cabinets. In these and other applications, access control systems and methods have been implemented to grant access only to authorized users and to update access permissions. The traditional locks have been developed over centuries to be sturdy and moderately difficult to bypass, and to function reliably without frequent inspection or maintenance. However, the traditional access control systems and methods are increasingly costly as a function of the security provided. Additionally, regardless of the level of security, traditional locks are very costly to properly maintain. For example, when a former user no longer is authorized, or when a key is lost, each potentially vulnerable mechanical lockset should be rekeyed or replaced. Consequently, updated access codes or keys must be distributed to all users who still should have access. Therefore, there is a need for improved access control systems and methods that can be cheaply and reliably maintained. In particular, there is a need for improved access control systems and methods that permit rapid and inexpensive updates of access permissions.

Electronic key systems have been used over the years and have proven to be a reliable mechanism for access control solutions. Exemplary electronic key systems are disclosed in U.S. Pat. No. 4,988,987, issued Jan. 29, 1991; U.S. Pat. No. 6,047,575, issued Apr. 11, 2000; U.S. Pat. No. 6,989,732, issued Jan. 24, 2006; U.S. patent application Ser. No. 10/893,648, published Mar. 10, 2005; and U.K. Pat. App. GB 2 144 483, published Mar. 6, 1985. Another electronic key system, fully commercialized in the hotel industry, is the VingCard® product line. However, the exemplary systems, despite their commercial success, do not to our knowledge provide reliable and secure means for rapidly updating access permissions in a distributed security application, wherein individual locks are installed in various far-flung locations so that capital costs or physical constraints prohibit placing the individual locks in direct communication with a central database or bringing the locks to a central location for reprogramming.

Therefore, there is a need for improved electronic key systems and methods capable to rapidly update access permissions in a distributed security application.

BRIEF SUMMARY OF THE INVENTION

According to the present invention, a highly secure electronic access control and monitoring system comprises an electronic lock, a key card, a card reader, and a central database. The electronic lock and the key card exchange encrypted credentials to control access to a secured area, and maintain encrypted records of access attempts. The key card and the card reader cooperate to update the key card credentials from the central database and to transfer the access records from the key card to the central database. The key card credentials periodically expire, thereby requiring frequent updates and validation of the credentials and permitting the key card to shuttle information between the lock and the central database.

In one aspect of the electronic access control and monitoring system, the electronic lock has a body including a smart card interface and a locking mechanism movably coupled to the body, the body defining an interior cavity having therein a lock microprocessor and a lock memory coupled thereto, the locking mechanism being movable between locked and unlocked positions in response to the lock microprocessor. The key card has a card microprocessor and a key card memory coupled thereto, and is engageable with the lock via the smart card interface for securely transferring data between the lock memory and the key card memory to operate the lock. The card reader is in communication with an administrator microprocessor, the administrator microprocessor being connectable to a database for storing data corresponding to at least one of the key card and the lock, and the key card is engageable with the card reader for transferring data between the key card memory and the database. The data stored in the lock, in the key card, and in the database is encrypted, as is data transferred therebetween. Accordingly, the lock, the key card, and the database each have encryption engines coupled to their respective microprocessors for encrypting and decrypting data processed by or transferred between any of the lock, the key card, and the database.

In one application of the present invention, a plurality of electronic locks is installed to control access to a plurality of secured areas—for example, supply cabinets in a classroom laboratory where a plurality of students complete a laboratory curriculum. Each newly reporting student among the plurality of students receives a key card programmed with a list of locks securing cabinets to which the student is permitted access. When a student completes their laboratory curriculum, or if the student loses their key card, the database, the key cards, and the locks are rapidly updated to reflect that the student no longer is permitted access. All the preceding is accomplished without incurring the capital costs and inconvenience associated with providing a wired network to each lock, and without the expense and technical effort associated with providing a wireless network between the locks and the database.

These and other objects, features and advantages of the present invention will become apparent in light of the detailed description of the best mode embodiment thereof, as illustrated in the accompanying drawings.

DETAILED DESCRIPTION OF EMBODIMENTS

Figure 1:
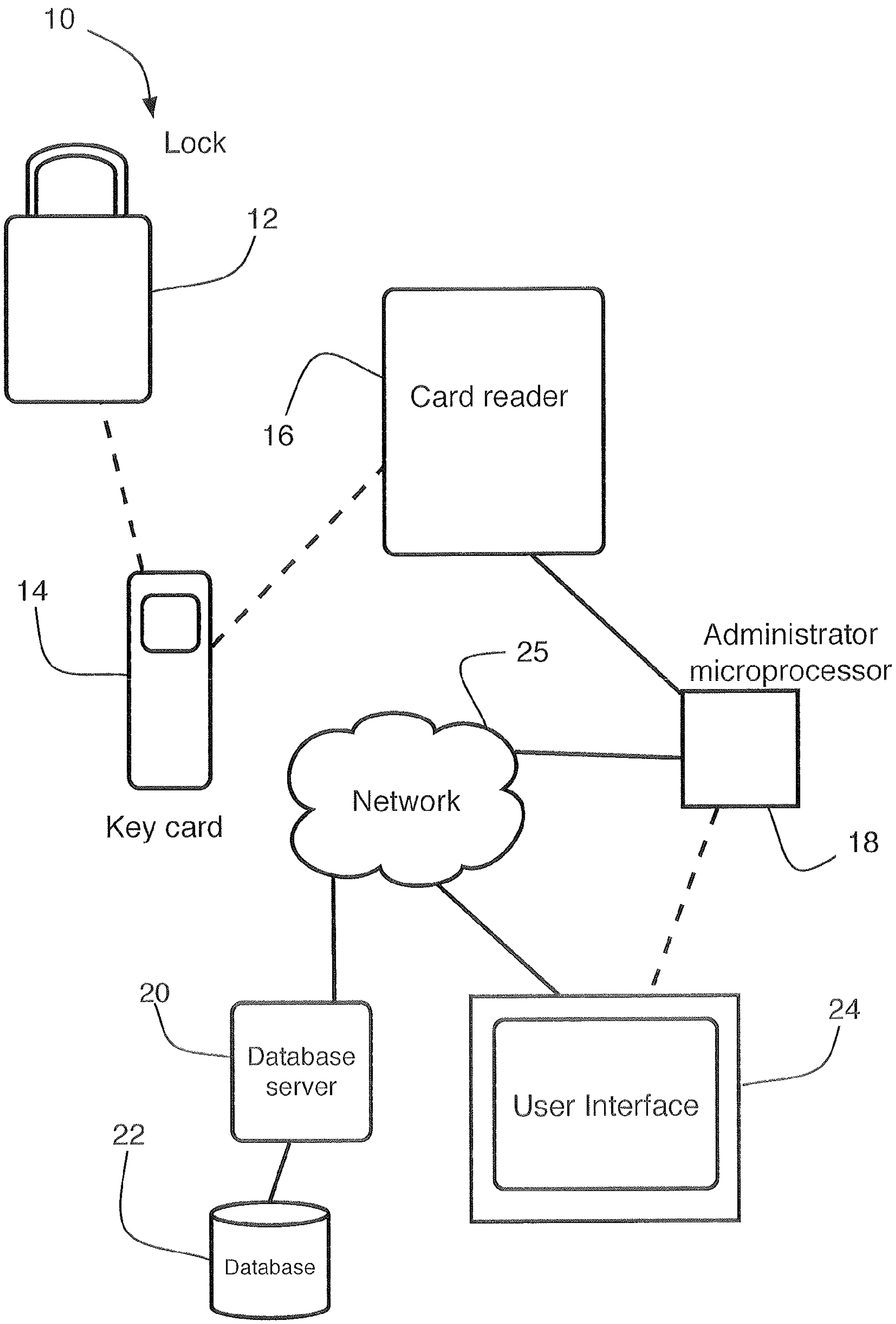
FIG. 1 is a schematic of an electronic access control and monitoring system, including a padlock, a key card, a card reader, an administrator microprocessor, and a database, according to one embodiment of the present invention.

Referring to FIG. 1, one embodiment of the present invention provides a lock system 10 comprising a padlock 12, a key card 14, and a card reader 16. The key card 14 is portable and is removably engageable with the padlock 12 so as to provide and record access to an area secured by the system 10 through exchange of information between the lock 12 and the card 14. The card reader 16 is in communication with an administrator microprocessor 18 that is in communication with a database server 20 that maintains a database 22 for storing information about the system 10. The key card 14 is removably engageable with the card reader 16 so as to transfer information between the padlock 12 and the database 22 via the administrator microprocessor 18 and the database server 20. The administrator microprocessor 18 also is configured to provide instances of a user interface 24 for observation, control, and modification of the system 10 via a network 25. For example, the network 25 may be any of the Internet, a secure wireless WAN, an infrared laser network, or any similar network structure.

Figure 2:
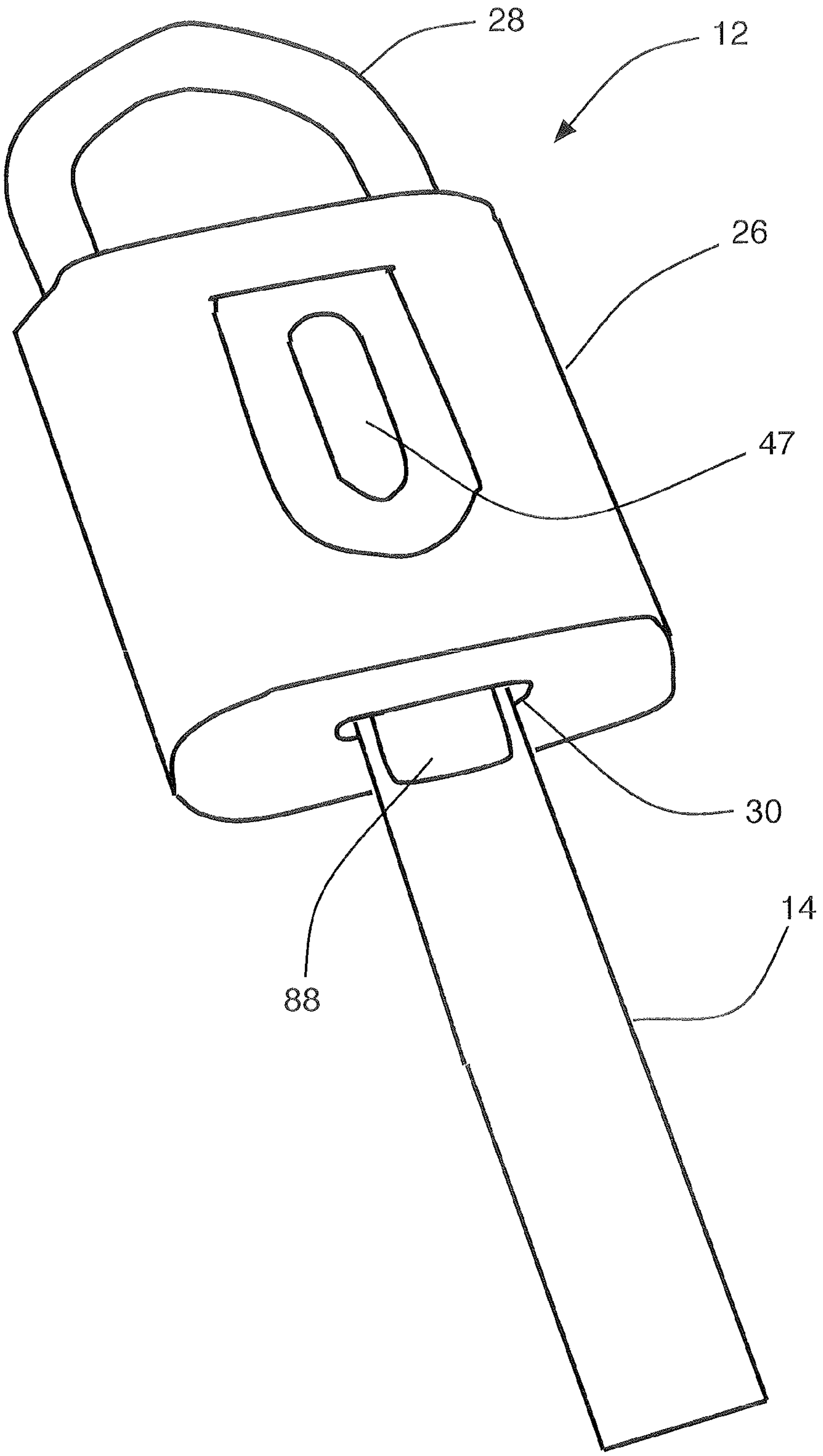
FIG. 2 is a perspective view of the lock and the key card of FIG. 1, according to one embodiment of the present invention.

Referring to FIG. 2, the padlock 12 includes a body 26 and a shackle 28. The shackle 28 is coupled to the body 26 and is movable relative to the body 26 between a locked position and an unlocked position as well known in the art of padlocks. The body 26 defines a key card opening 30 for receiving at least a portion of the key card 14. The portion of the key card 14 received in the card opening 30 includes a smart card interface 88, further discussed below with reference to internal components of the padlock 12. Optionally, the body 26 also includes a lock access indicator 47, as further discussed with reference to FIG. 3 below.

Figure 3:
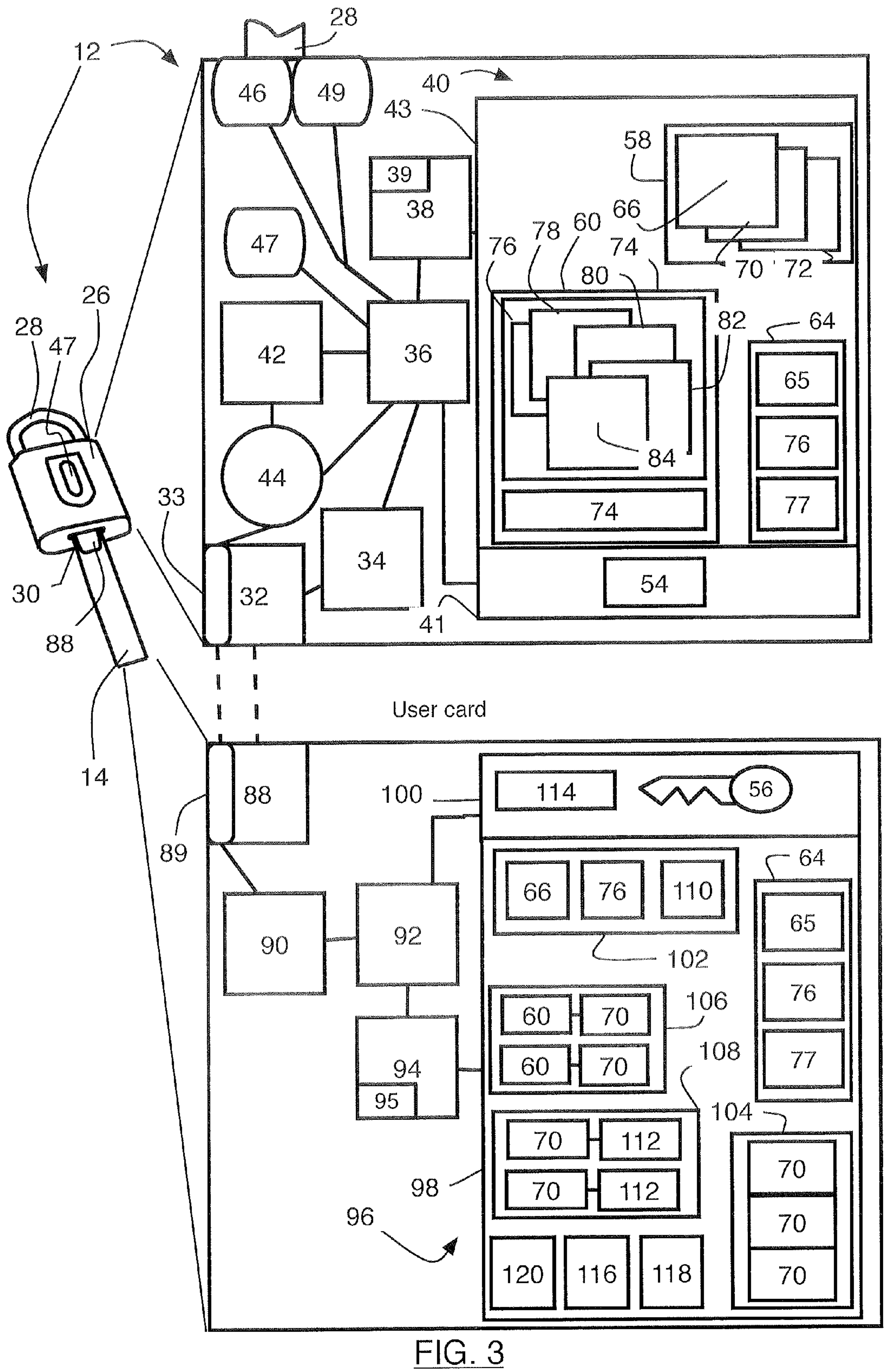
FIG. 3 is a block diagram of the lock and of a user card configuration of the key card of FIG. 1, according to one embodiment of the present invention.

Referring to FIG. 3, the body 26 of the padlock 12 encloses operative components for controlling and monitoring access to a secured area. Preferably, the padlock body 26 includes at least a smart card interface 32, a smart card encryption engine (SCEE) 34, a lock microprocessor 36 in communication with the smart card interface 32 via the SCEE 34, a lock memory access encryption engine 38, a non-volatile lock memory 40 in communication with the lock microprocessor 36 via the lock memory access encryption engine 38, a real time clock 42 in communication with the lock microprocessor 36, a battery 44 (or other electrical power supply) providing power to at least the lock microprocessor 36 and the real time clock 42, and a latch mechanism 46 operable to engage a portion of the shackle 28 in the locked position. Optionally, the body 26 may house a lock access indicator 47 in communication with the lock microprocessor 36. The body 26 also may include a position sensor 49 for detecting whether the shackle 28 is in the locked position. In one embodiment, the body 26 may further include a capture mechanism for keeping the key card 14 in the card opening 30 while the shackle 28 is not in the locked position.

The smart card interface 32 of the padlock 12 is compatible with the smart card interface 88 of the key card 14, and cooperates with the smart card interface 88 to transfer information between the padlock 12 and the key card 14. Preferably, each of the smart card interfaces 32 and 88 includes a connector compatible with a GSM 11.11 SIM card and also includes a universal asynchronous receiver/transmitter (UART) having at least a bi-directional data pin and a clock pin. When the key card 14 is inserted into the key card opening 30, the smart card interface 88 engages the smart card interface 32, thereby allowing information to be transferred between the key card 14 and the padlock 12. Optionally, the lock 12 may be equipped with multiple smart card interfaces 32 so that more than one key card 14 must be simultaneously inserted to cause the padlock 12 to open. In other embodiments, the padlock 12 can include an external interface for engaging the key card 14 for operating the padlock and transferring data between the padlock and the key card.

Optimally, the smart card interfaces 32 and 88 have complementary power contacts 33 and 89 that may be used, among other purposes, for providing back-up power from the key card 14 to the padlock 12 in the event of a dead battery 44. In one embodiment, the padlock 12 includes circuit means for sensing presence or absence of voltage supplied from the key card via the power contacts 89 and 33. Additionally, the smart card interface 32 may include a detection switch providing for the detection of an inserted key card 14 to revive the padlock 12 from a low power sleep mode, thereby conserving the charge of the battery 44.

Figure 6:
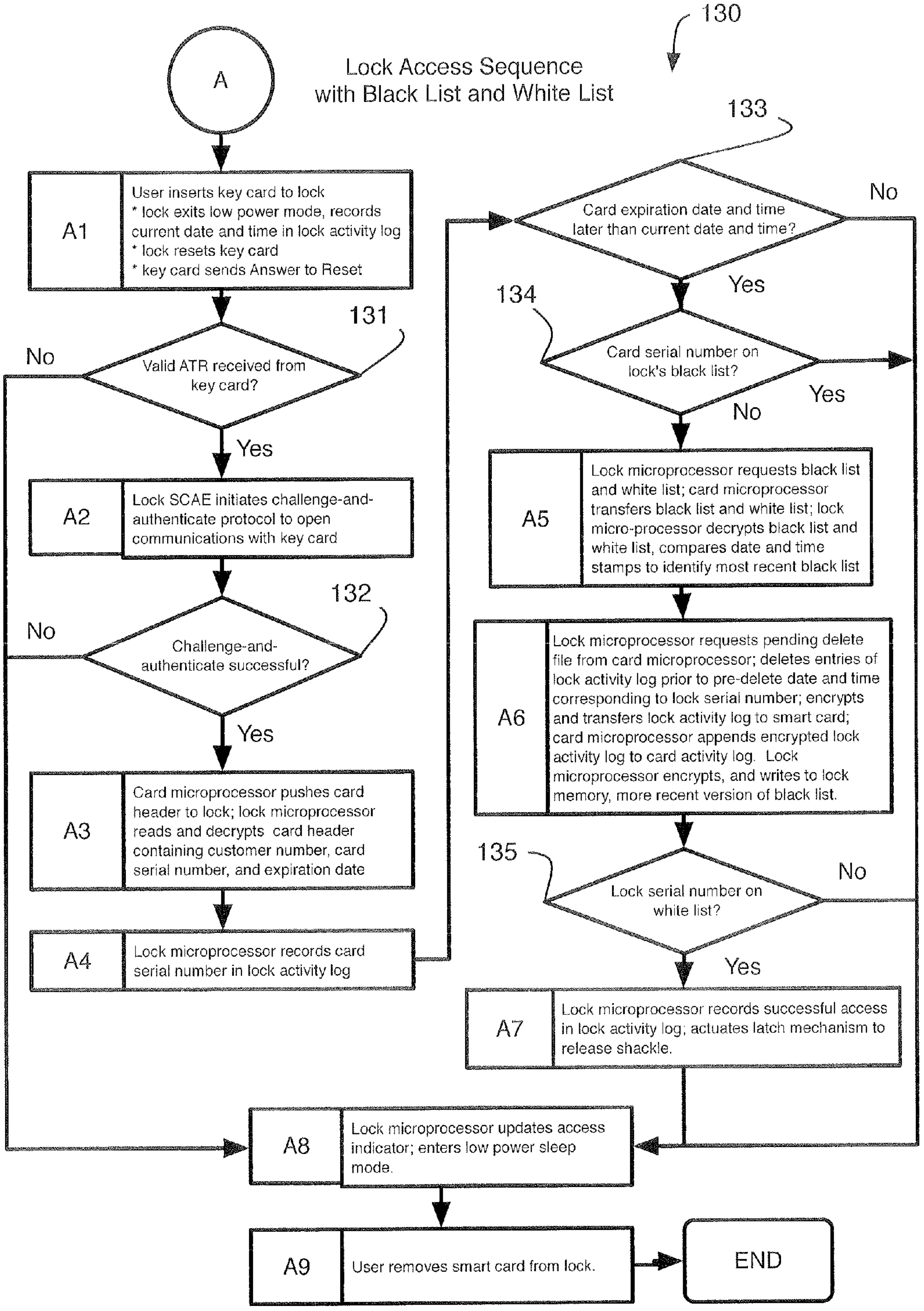
FIG. 6 is a flow chart of a lock access sequence using the lock and the key card of FIG. 1, according to an embodiment of the present invention.
Figure 8:
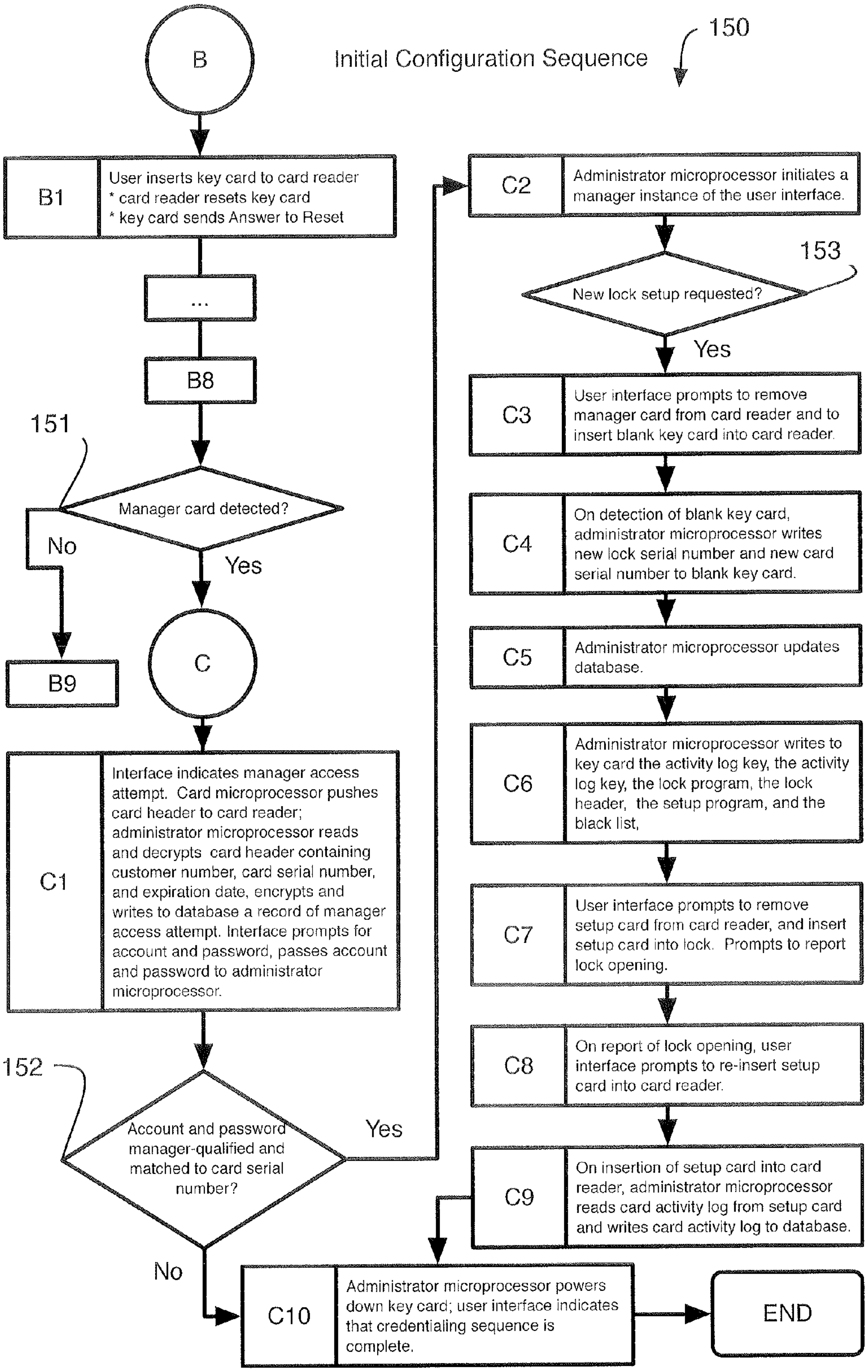
FIG. 8 is flow chart of an initial configuration sequence using the key card and the card reader of FIG. 1, according to an embodiment of the present invention.

The SCEE 34 encrypts and decrypts all information transferred from and to the lock microprocessor 36 through the smart card interface 32, using at least a low level communications key (not shown) and a secret group key (not shown). The low level communications key and the secret group key are used in a challenge-and-authenticate protocol for establishing communication between the key card 14 and the lock 12, as further discussed below with reference to a lock access sequence 130 as shown in FIG. 6. Thus, personnel who gain physical access to the padlock 12 will not be able to obtain electronic access to the lock memory 40 without also having possession of an authorized key card 14. In one embodiment, when the lock 12 is manufactured, the SCEE 34 is configured with a preset low level communications key and a preset secret group key known collectively as transfer keys. After delivery to a customer but prior to normal use of the lock 12, the SCEE 34 is reconfigured by overwriting the transfer keys with a custom low level communications key and a custom secret group key, as further discussed below with reference to FIGS. 8 and 9.

From manufacture until delivery of the padlock 12, the lock memory 40 preferably is blank. After delivery, a user performs an initial configuration sequence 150 and a lock setup sequence 160, as further discussed below, to configure the padlock 12 and the lock memory 40. The lock setup sequence 160 can only be performed once per lock, in order to prevent security breaches by re-initialization of locks. After performance of the lock setup sequence 160, the lock memory 40 includes an unencrypted lock memory 41 and an encrypted lock memory 43. The unencrypted lock memory 41 stores at least a lock program 54, by which the lock microprocessor 36 self-configures at power up. The encrypted lock memory 43 stores files containing information about the padlock 12 and about various key cards 14, including a lock header 58, a lock activity log 60, and a version of a black list 64. Preferably, the files stored in the encrypted lock memory 43 are encrypted by the LMAEE 38 using an activity log key 56 that is stored on the key card 14, as further discussed below. Even if unauthorized recipients of encrypted data have access to the lock 12 and to the LMAEE 38, they cannot access the files in the encrypted lock memory 43 without the activity log key 56.

The lock microprocessor 36 is configured to read the lock program 54, at power up of the padlock 12, from the unencrypted lock memory 41. The lock microprocessor 36 then controls the operation of the padlock 12 according to the lock program 54, as further discussed below with reference to the lock access sequence 130. Preferably, the lock microprocessor 36 provides pulse-width-modulated digital output for direct operation of the latch mechanism 46, including a stepper motor or high-voltage piezo-electric element. Preferably, the lock microprocessor 36 also provides a low power sleep mode for conserving life of the battery 44 between operations of the padlock 12. In some embodiments, the lock microprocessor 36 updates the lock access indicator 47 based on access attempts. In some embodiments, the lock microprocessor 36 also controls a key card capture mechanism based on signals from the position sensor 49.

In one embodiment of the system 10, the LMAEE 38 uses the activity log key 56 in an industry standard encryption method such as Triple DES to encrypt and decrypt the information written to and retrieved from the encrypted lock memory 43 by the lock microprocessor 36. The LMAEE 38 includes a volatile cache memory 39 in which the activity log key 56 is stored while the lock 12 cooperates with the key card 14. At power down of the lock 12, the LMAEE cache memory 39 is cleared. In other embodiments of the padlock 12, the lock microprocessor 36 can include a built-in data encryption engine.

The real time clock 42 provides calendar information including date and time information to the lock microprocessor 36. Typically, the clock 42 of the padlock 12 is seeded at the factory and using a lifetime battery, maintains a current date and time in GMT (Greenwich Mean Time) format or in any other desired format.

The battery 44 typically is a replaceable battery, but may be a rechargeable battery. The battery 44 is capable of trickle discharge for a low power sleep mode, and is capable to provide voltage and current sufficient to efficiently operate the latch mechanism 46.

The latch mechanism 46 is coupled to and controlled by the lock microprocessor 36 for movement relative to the body 26 between a latched position that would engage and secure the shackle 28 (if present in the locked position) and an unlatched position that would not engage the shackle 28. In one embodiment, the latch mechanism 46 includes a piezoelectric actuator, such as an AL2 active latch mechanism manufactured by Servocell Ltd., Harlow, Essex, United Kingdom. The AL2 actuator provides a durable actuator requiring relatively low power consumption (approximately 25 mJ per operation) when compared to typical solenoids and electric motors. In other embodiments of the present invention, the latch mechanism 46 can include one of a micro motor, a solenoid, or a stepper motor.

The padlock 12 is a locked-down hardware device with disassembly protection. In one embodiment, disassembly protection is incorporated to the latch mechanism 46, and is effective whenever the latch mechanism is latched, so that attempting to disassemble the padlock 12 with the latch mechanism 46 in the latched position will result in substantial destruction and/or erasure of at least one of the lock microprocessor 36, the lock memory access encryption engine 38, and the lock memory 40. When not powered from the battery 44 or from the power contact 33, the latch mechanism 46 defaults to the latched position. In another embodiment, disassembly protection is effective unless the latch mechanism 46 is unlatched with power supplied through the power contact 33.

The lock access indicator 47 is operable to change state as directed by the lock microprocessor 36. For example, if a padlock 12 is activated by a key card having a card serial number listed on the black list 64, then the lock microprocessor 36 may direct the access indicator 47 to indicate a failed access attempt by an unauthorized user. Typically, the lock access indicator 47 is configured to reset upon a successful access attempt wherein the lock access indicator is returned to an un-tripped state and indicates that no one has attempted to access the padlock 12 since the last access recorded. In one embodiment, only a manager card can be used to reset the lock access indicator 47, and between accesses by the manager card the lock access indicator 47 provides an incremental indication of accesses and attempted accesses. Preferably, the access indicator 47 comprises an indicator that has a low maintenance power demand, for example any of an electrostatic display, an LCD display, an electronic ink display, a mechanical indicator, and similar indicating means that require power to change state but not to maintain state.

The position sensor 49 is operable to detect whether the shackle 28 is in the locked position. The position sensor 49 may function by Hall effect, by piezo-electric contact, by electrical contact, by interrupted or reflected light, or by other principles well known in the art.

The lock program 54 stored in the unencrypted lock memory 41 is loaded and run by the lock microprocessor 36 each time that the key card 14 is inserted to the key card opening 30. The lock program 54 configures the lock microprocessor 36 to interact with at least the key card 14, the clock 42, and the latch mechanism 46 so as to accomplish the lock access sequence 130. The lock program 54 may also comprise a sequence for checking voltage of the battery 44 to generate a low battery indication, a sequences for sending control signals to the latch mechanism 46, a sequence for modifying the lock access indicator 47, and other useful instructions.

The lock header 58 includes at least a customer identification number 66, a lock serial number 70, and an in-service date 72. The customer identification number 66 is a unique identifier assigned to a purchaser associated with the lock 12. The lock serial number 70 also is a unique identifier that distinguishes the lock 12 from similar locks. The lock serial number 70 is assigned by the administrator microprocessor 18 to the padlock 12 during the lock setup process 160, further discussed below with reference to FIG. 9. The in-service date 72 provides information indicative of a service life of the padlock 12 and is used to predict remaining life of the battery 44. After a configurable period of time or number of lock access attempts has elapsed from the in service date 72, or after a voltage of the battery 44 has fallen below a configurable threshold value, the lock microprocessor 36 will enter a low battery warning (not shown) in the lock activity log 60 each time the key card 14 is inserted in the key card opening 30, as discussed above. The in service date 72 can be initialized during an initial configuration of the padlock 12 and reset thereafter when the battery 44 is replaced in the lock. Alternatively, in another embodiment, the in service date 72 cannot be reset and is configured for initialization one time only during an initial configuration of the padlock 12.

The lock activity log 60 includes a plurality of activity records 74 related to a plurality of access attempts on the padlock 12. In one embodiment, each of the plurality of activity records 74 includes the following information:

1) a key card serial number 76
2) an access attempt date and time 78
4) a number of failed access attempts 80
5) an ultimate action code 82
6) a location 84
7) the lock serial number 70

A new activity record including the above-identified information is appended to the lock activity log 60 for each successful attempt, or for the first failed attempt, to access the padlock 12 by a key card 14 having the card serial number 76. As set forth above, each of the plurality of activity records 74 includes the key card serial number 76 associated with the key card 14 used to access the padlock 12. The access attempt date and time 78 are recorded in local time or in Greenwich Meridian Time (GMT). In certain embodiments of the padlock 12, a GPS device is provided within the body 26 of the lock and coupled to the lock microprocessor 36 so that a location of the padlock can be tracked each time that a key card 14 is inserted to the padlock 12. Thus, the location 84 is stored in the activity record 74 if the lock 12 is equipped with a Global Positioning System (GPS) device (not shown).

To conserve space in the lock encrypted memory 43, and thereby reduce the slight likelihood of failed access attempts resulting in an overflow exploit of the lock activity log allocated memory space, rather than writing a new activity record 74, the number of failed access attempts 80 corresponding to the card serial number 76 is incremented at each consecutive failed attempt by the same key card 14. The ultimate action code 82 corresponds to the result of the access attempt. For example, the ultimate action code 82 is set to 1111 if the lock is opened thereby indicating a successful access. Alternatively, the ultimate action code 82 is set to 0000 to indicate a failed access attempt due to a communications error, or to various intermediate values to indicate failed access attempts for other reasons.

The black list 64 stored in the lock memory 40 stores the card serial numbers 76 associated with key cards 14 that are, for any reason, listed as deactivated in the database 22. Key cards 14 having card serial numbers 76 identified in the black list 64 in the lock memory 40 of the padlock 12 will not function to unlock the padlock 12 or to retrieve information from the lock. In one embodiment of the system 10, if a key card 14 is lost or if the employment of a person possessing the key card 14 is terminated and the key card cannot be secured, the database 22 is updated via the user interface 24 to append the corresponding key card serial number 76 to the black list 64, thereby prohibiting access by the key card 14. Each key card 14 that thereafter communicates with the card reader 16 receives an updated version of the black list 64 through the credentialing sequence 140, and each key card 14 then transfers the updated version of the black list 64 to each padlock 12 with which the key card subsequently communicates through the lock access sequence 130. Thus the prohibition of the key card 14 rapidly propagates through the system 10 by normal operation of the system. Optimally, a security manager can promptly tour the areas secured by the system 10, inserting the manager's key card 14 in each lock to ensure rapid updating of all locks. As discussed below with reference to the key card 14 and to the lock access sequence 130, each key card 14 also carries an expiration date and time 110, which acts as a secondary safeguard against unauthorized access in the event that any of the locks 12 is not promptly updated to prohibit a lost key card. Because the black list 64 is modified from time to time, each version of the black list 64 is marked with a credential date and time 65. When a key card 14 is inserted into the card opening 30, the lock microprocessor 36 can compare credential dates and times 65 on the key card version of the black list 64 and on the lock version of the black list 64 to identify a later version of the black list 64. The lock microprocessor 36 then writes the later version of the black list 64 through the LMAEE 38 to the encrypted lock memory 43.

Still referring to FIG. 3, the key card 14 is in the form of a "Smart Card", "SimStick", or other embodiment of the JAVA Card industry standard having embedded integrated circuitry and capable to process and store information, as is well known to one skilled in the art. The key card 14 provides a key carrier, who may be a user or a manager, with access to areas secured by the locks 12. The key card 14 also records the key carrier's access to secured areas, and transfers information to and from the individual locks 12 and the database 22. Accordingly, the key card 14 includes at least a smart card interface 88, a smart card encryption engine (SCEE) 90, a card microprocessor 92 in communication with the smart card interface 88 via the smart card encryption engine 90, a card memory access encryption engine (CMAEE) 94, and a card memory 96 in communication with the card microprocessor 92 via the CMAEE 94.

Figure 4:
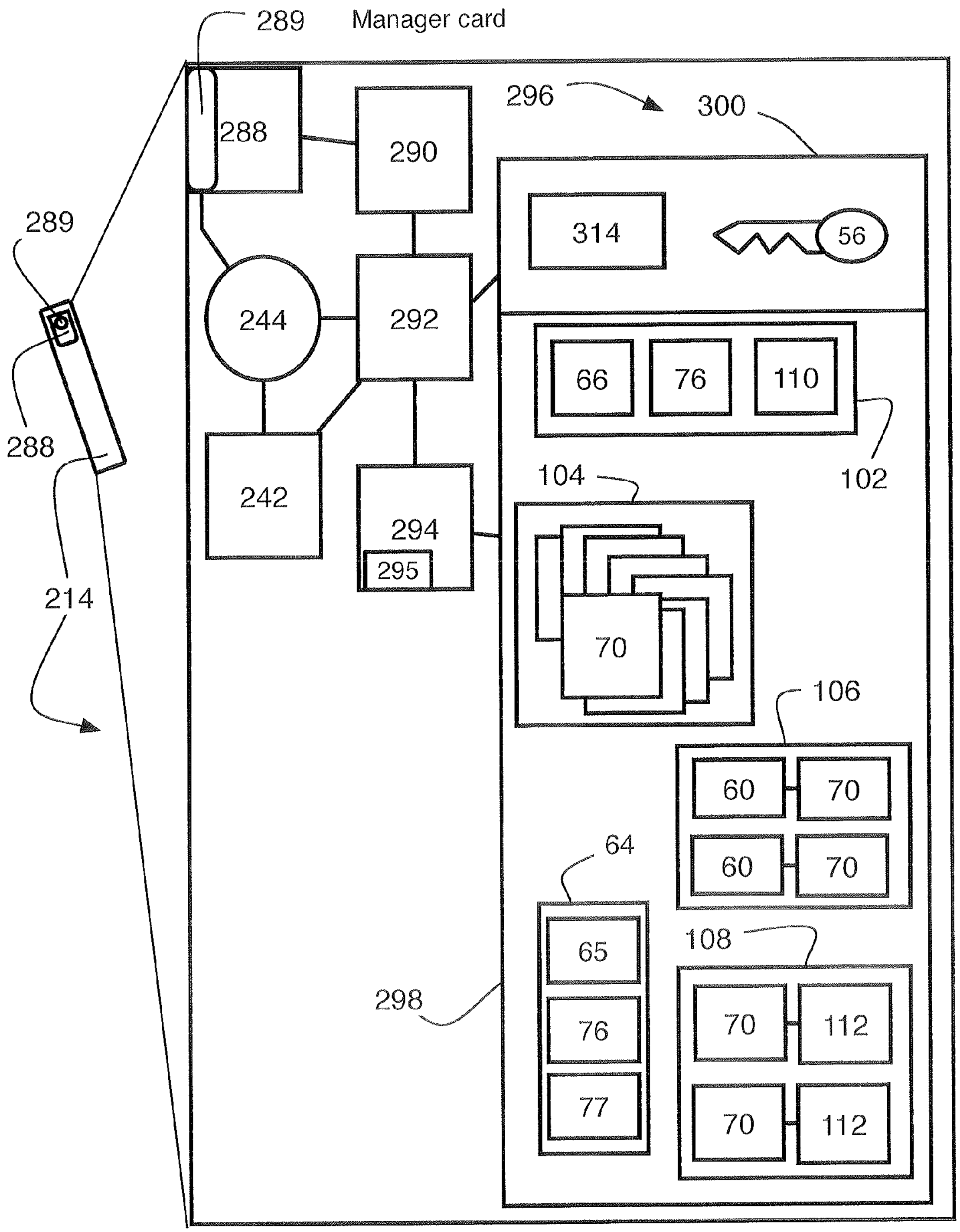
FIG. 4 is a block diagram of a manager card configuration of the key card of FIG. 1, according to another embodiment of the present invention.
Figure 5:
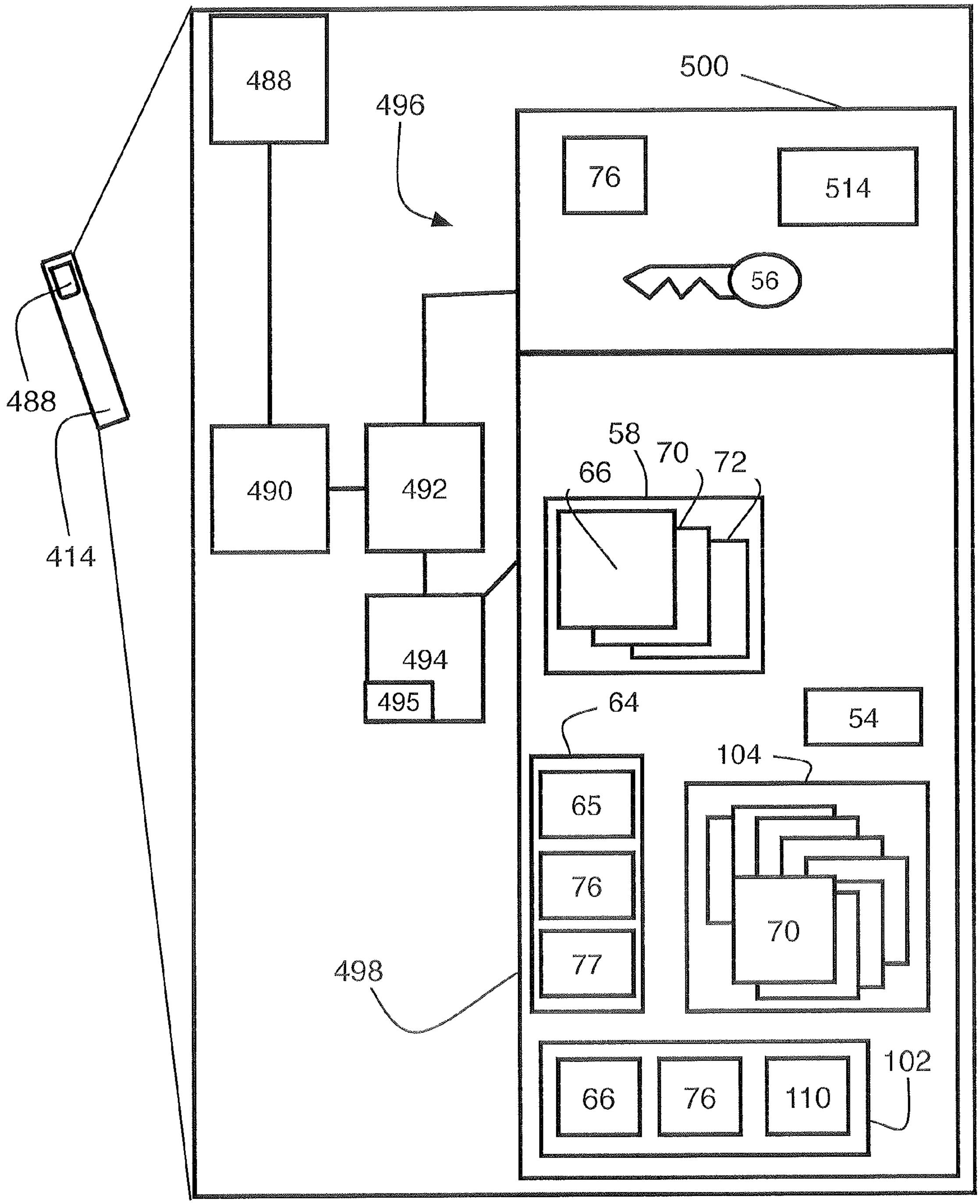
FIG. 5 is a block diagram of a setup card configuration of the key card of FIG. 1, according to another embodiment of the present invention.

In one embodiment, as shown in FIG. 3, the key card 14 is configured as a user card that does not include a battery or a clock and uses the battery 44 of the padlock 12 for powering the components of the key card. In a second embodiment, as shown in FIG. 4, the key card 14 is configured as a manager card 214 that includes both a battery 244 for powering one or both of the key card and the padlock 12, and a clock 242 powered by the battery 244 and in communication with the card microprocessor 92. In a third embodiment, as shown in FIG. 5, the key card 14 is configured as a setup card 414 lacking a battery and a clock, but carrying in the card memory 496 initial configuration information for a new lock 12. In FIGS. 3-5, like reference numbers refer to like components, reference numbers for each distinct configuration of the key card 14 being incremented by prefixing multiples of 200.

The smart card interface 88 is compatible with the smart card interface 32, as above described with reference to the lock 12. Insertion of the key card 14 in the key card opening 30 engages the smart card interface 88 with the smart card interface 32, thereby allowing information to be transferred between the card microprocessor 92 and the lock microprocessor 36 via the SCEE 90 and the SCEE 34.

The SCEE 90 is provided for encrypting and decrypting data transferred between the smart card interface and the card microprocessor 92, using the secret group encryption key (not shown). As discussed above with reference to the lock SCEE 34, and as discussed below with reference to the lock access sequence 130, the SCEE 90 cooperates with the lock SCEE 34 to accomplish a challenge-and-authenticate or "handshake" procedure for establishing secure encrypted communications between the lock microprocessor 36 and the card microprocessor 92.

The card memory 96 includes an encrypted memory 98 and an unencrypted memory 100. The card microprocessor 92 is configured to read information from the unencrypted memory 100 at power up. The CMAEE 94 is provided for encrypting and decrypting the information transferred between the card microprocessor 92 and the encrypted card memory 98, using the activity log key 56, so that even if the key card 14 is lost, the data stored in the card memory 96 is inaccessible or unusable without access to the activity log key 56. The activity log key 56 is stored both in the unencrypted lock memory 41 and in the database 22, and during operation of the CMAEE 94 the activity log key 56 is held in a volatile cache memory 95 in communication with the CMAEE 94.

The contents of the encrypted memory 98 and of the unencrypted memory 100 vary according to how the key card 14 has been configured. Typically, the encrypted memory 98 contains at least a version of the black list 64, a card header 102, a white list 104, a card activity log 106, and a pending delete file 108. The CMAEE 94 uses the activity log key 56, which is stored only in the unencrypted memory 100, to encrypt all files stored in the encrypted memory 98.

The unencrypted memory 100 is accessible via the SCEE 90 and the card microprocessor 92 only when the key card 14 is in communication with and powered by the lock 12 or when the key card 14 is in communication with the administrator microprocessor 18 via, and powered by, the card reader 16. Thus, the activity log key 56 can be loaded into the CMAEE cache 95, the administrator microprocessor cache 19, or the LMAEE cache 39 only when the key card 14 is inserted into the lock 12 or into the card reader 16. In addition to the activity log key 56, the unencrypted memory 100 contains a user program 114, a manager program 122, and a setup program 124.

The version of the black list 64 carried in the encrypted memory 98 is marked with the credential date and time 65 associated with the most recent credentialing of the key card 14 by the card reader 16, as further discussed below with reference to the credentialing sequence 140.

The card header 102 includes at least the card serial number 76 and a card expiration date and time 110. The card expiration date and time 110 is typically a future date assigned to the key card 14 upon initialization or credentialing thereof, and is a last date that the card can be used to activate a padlock 12 prior to being recredentialed, as further discussed herein below. The card serial number 76 is a unique identifier that distinguishes each key card 14 from other similar key cards and that is recorded in the lock activity logs 60 to track the use of each key card 14. In one embodiment, the card header 102 may also include the group identification number 77 shared by several key cards 14 having distinct card serial numbers 76. In another embodiment, as shown in FIG. 3, the card header 102 includes a customer identification number 66 associated with the database 22.

The white list 104 contains one or more lock serial numbers 70, each lock serial number corresponding to one lock 12 that the key card 14 is authorized to access.

In the embodiments shown in FIGS. 3 and 4 (the user card and the manager card, respectively), the encrypted memory 98 contains a card activity log 106 and a pending delete file 108. The card activity log 106 contains copies of a plurality of lock activity logs 60, each of the plurality of lock activity logs corresponding to one of the plurality of locks 12 identified by the white list 104. Within the card activity log 106, each lock activity log 60 is labeled by its corresponding lock serial number 70. As further discussed below, the details of the lock activity logs 60 will vary from time to time as the user card 14 is engaged with each lock 12 and with the card reader 16.

The pending delete file 108 stores a plurality of lock serial numbers 70 and a corresponding plurality of pre-delete dates and times 112 indicating, for each lock serial number 70, the most recent entry of the corresponding lock activity log 60 that has been copied from the card activity log 106 to the database 22. Accordingly, at any given time the card activity log 60 corresponding to each lock serial number 70 should contain only entries having dates and times later than the pre-delete date and time 112 corresponding to the lock serial number 70. In another embodiment (not shown) the card activity log 106 may provide the functionality of the pending delete file 108, by retaining the latest entry of each lock activity log 60 when the card activity log 106 is copied to the database 22. Then the earliest entry of each lock activity log 60 within the card activity log 106 will be marked with the pre-delete date and time 112 for the corresponding lock 12.

Referring to FIG. 3, the user card configuration of the key card 14 contains in the unencrypted memory 100 a user program 114 and the activity log key 56. The encrypted memory 98 includes an access schedule 116 defining a variety of access privileges that can be set based upon location, day of week, time of day, number of uses, number of failed access attempts, and similar considerations. Additionally, the encrypted memory 98 includes a configurable failed access threshold value 118, and a cumulative failed access attempt counter 120.

The user program 114 configures the card microprocessor 92 to initiate communications with and to receive instructions from the lock microprocessor 36, and to transfer information to and from the encrypted card memory 98 according to the instructions from the lock microprocessor 36, as further discussed below with reference to a lock access sequence 130. The user program 114 also configures the card microprocessor 92 to initiate communications with the administrator microprocessor 18 via the smart card interface 88 and the card reader 16, as further discussed below with reference to the credentialing sequence 140.

Optimally, the user program 114 configures the card microprocessor 92 to increment the failed access attempt counter 120 each time that the key card 14 fails to access a lock 12. When the failed access attempt counter 120 exceeds the failed access threshold 118, the card microprocessor 92, in accordance with the card program 114, adds the card serial number 76 of the key card 14 to the version of the black list 64 that is stored in the encrypted memory 98. Thus, a lost key card will automatically become black listed if a finder of the lost key card repeatedly tries to access unauthorized locks.

Referring to FIG. 4, the manager card configuration 214 of the key card 14 contains in the unencrypted memory 300 a manager program 314 and the activity log key 56. The manager program 314 configures the card microprocessor 292 to initiate communications with, and give instructions to, the lock microprocessor 36, as further discussed below with reference to the lock access sequence 130. The white list 104, stored in the encrypted memory 298, contains all the lock serial numbers 70 associated with the customer identification number 66. Accordingly, a manager key carrier has unrestricted access to all locking devices 12 having the customer identification number 66. Access control managers employed by a particular user having the customer identification number 66 are thereby able to rapidly collect and update access monitoring and control information at each locking device 12. Optionally, the manager program 314 could configure the manager card 214 for transferring data to and from the lock 12 without opening the lock 12. The manager program 314 also configures the card microprocessor 292 to initiate communications with, and give instructions to, the administrator microprocessor 18 via the card reader 16, so as to provide a manager card carrier with access to managerial functions of the user interface 24, as further discussed below with reference to the initial configuration sequence 150.

Referring to FIG. 5, the setup card configuration 414 of the key card 14 is configured by the initial configuration sequence 150, as further discussed below, for initializing a new padlock 12. Accordingly, the unencrypted memory 500 of the setup card 414 contains the card serial number 476, the activity log key 56, custom low level communication and secret group keys, and a setup program 514. The encrypted memory 498 of the setup card 414 contains the lock program 54 and the lock header 58 for the new padlock 12, a most recent version of the black list 64 copied from the database 22, and the white list 104 containing at least the lock serial number 70 corresponding to the new lock 12. Importantly, the SCEE 490 of the setup card is configured with the transfer keys rather than with the custom keys stored in the unencrypted memory 500.

The setup card microprocessor 492 is configured to read the setup program 514 from the unencrypted memory 500 when the setup card is powered on by insertion into the card opening 30 of a lock 12. The setup program 514 further configures the setup card microprocessor 492 to direct the setup card SCEE 490 to initiate a challenge-and-authenticate protocol with the lock 12 using the transfer keys stored in the SCEE 490. If the lock 12 is a new lock, then the SCEE 34 of the lock 12 also will be configured with the transfer keys and the challenge-and-authenticate will be successful. Accordingly, the setup program 514 will proceed to configure the setup card microprocessor 492 to initialize the lock 12, as further discussed below with reference to the lock setup sequence 160 of FIG. 9. If the lock 12 is not a new lock having the SCEE 34 configured with the transfer keys, then the challenge-and-authenticate protocol will fail and the setup card 414 will be deactivated, for example by erasing all or a portion of the memory 496.

Referring back to FIG. 1, the system 10 also includes a card reader 16. The card reader 16 includes a smart card interface 128 that is substantially similar to the smart card interfaces 32 and 88 as discussed above with reference to the lock 12 and the key card 14. The card reader 16 is in communication with the administrator microprocessor 18 for transferring data between (to/from) the key card 14 and the system database 22 maintained by the associated database server 20. In one embodiment, the card reader 16 is configured to detect the configuration of the inserted key card 14, for example by sensing presence or absence of voltage from the battery 244 on a manager card 214. In another embodiment, the card reader 16 can recharge the battery 244 via the power contacts of the smart card interfaces 288 and 128.

The administrator microprocessor 18 is configured to provide the user interface 24 via the network 25. Preferably, the administrator microprocessor 18 also is configured to transfer information between the user interface 24 and the database server 20. In one embodiment, the administrator microprocessor 18 is configured to perform a credentialing sequence 130 for each key card 14 inserted into the card reader 16, as further discussed below. As an initial part of the credentialing sequence 130, the administrator microprocessor 18 is configured to act as a smart card encryption engine (SCEE) using the custom low level communication key and the custom secret group key associated with a user of the key card 14. Additionally, the administrator microprocessor 18 is configured to provide instructions to the database server 20 for transfer of information between the database 22 and the key card 14 inserted into the card reader 16, or between the database 22 and the user interface 24. The information transferred between the database 22 and the key card 14 remains encrypted by the activity log key 56. Typically, the administrator microprocessor 18 cooperates with the database server 20 to decrypt information that will be transferred from the database 22 to the user interface 24, and to encrypt information that will be transferred from the user interface 24 to the database 22. The administrator microprocessor 18 then transfers the information to and from the user interface 24 using a secure network protocol such as SSL or https. In one embodiment, the administrator microprocessor 18 is configured to provide the user interface 24 only as part of the credentialing sequence. In another embodiment, the administrator microprocessor 18 is configured to provide distinct instances and variations of the user interface 24 depending on the configuration of the key card 14 inserted into the card reader 16 and depending on an account-and-password qualification process. For example, a manager instance of the user interface 24 may be provided when a manager card is inserted into the card reader 16 and a manager account and password are entered into the user interface 24. Similarly, a user instance of the user interface 24 may be provided when a user card is inserted into the card reader 16 and a user account and password are entered into the user interface 24.

When a card 14 goes through the credentialing sequence 140, the administrator microprocessor 18 integrates into the secure central database 22 the card activity log 106 including all the lock activity logs 60 gathered during attempts to access locks 12 using the card 14. The administrator microprocessor 18 also analyzes usage of card memory 40 in comparison to a total capacity of card memory 40.

The credentialing sequence 140, which sets a new expiration date and time for the card 14, includes managerial defaults for all pertinent settings. Once such setting is a re-credential threshold. For instance during the initial configuration 150 of a new key card 14, the expiration date and time is generated by adding the managerial default re-credential threshold to a creation date and time. A manager-qualified user can set the re-credential threshold for each card, typically anything from hours to days, weeks or months.

The administrator microprocessor 18 analyzes the activity log 60 for each card 14, and automatically calculates a suggested re-credential threshold based upon comparing the memory filled by the activity log 60 to the capacity of the card memory 40. Over time the analysis will yield results that allow cards to never exceed their storage limits while at the same time providing the highest level of protection against lost cards or rogue users exploiting the time period between a card being misplaced, and its integration into the black list 64.

The suggested re-credential threshold is communicated to the manager-qualified user through a report for each card reflecting daily, weekly, and monthly card activity, percentage of capacity used within the re-credential threshold, and the suggested re-credential threshold, based upon a running average of usage. The suggested re-credential threshold will typically be rounded up to an easily understood value to prevent confusion to a user as the proper date and time for re-credentialing a card.

Managerial defaults can optionally be set to allow an automatic adjustment of a users expiration date and time and would typically allow a level of granularity adjustment to allow a re-credential threshold for a given card to gradually grow or shrink towards the optimum time frame and to prevent spikes in activity from rapidly decreasing the re-credential therhold below a minimum practical value such as one hour.

The database server 20 is configured to manage the database 22, and to transfer information between the administrator microprocessor 18 and the database 22, according to any of the database standards or protocols known in the art. In one embodiment, the database server 20 is implemented on the administrator microprocessor 18, which is housed in a dedicated smart lock system computer (not shown).

The database 22 is configured to store information related to a plurality of locks 12 and a plurality of key cards 14 used in the lock system 10. In one embodiment, the lock system 10 includes a plurality of instances used by a plurality of entities having distinct customer identification numbers 66, and the system database 22 stores data associated with a plurality of locks 12 and a plurality of key cards 14 corresponding to each of the plurality of customer identification numbers 66. The database 22 is encrypted to protect the information stored therein. In one embodiment, the database 22 is encrypted by the administrator microprocessor 18 using the activity log key 56 stored only on each of the key cards 14.

In one embodiment, the user interface 24 is a graphical user interface enabled by a web browser and the network 25 is the Internet. Alternatively, the user interface 24 may be a touch-tone or voice activated telephonic interface, a text-based command line interface, or any other means to observe and modify both the information contained within the database 22 and the operation of the administrator microprocessor 18. In another embodiment, the user interface 24 is accessible only through the dedicated smart lock system computer (not shown). Preferably, the user instance of the user interface 24 indicates that the credentialing sequence 140 is in process, but does not provide any of the managerial functions available through the manager instance of the user interface 24. Preferably, the managerial functions of the user interface 24 include:

modifying the black list 64;

performing an initial configuration sequence 150, as further discussed below;

writing a version of the white list 104 to a key card 14;

providing a history of lock and key card activity from the database 22;

establishing new user and manager accounts; and modifying any of the user program 114, the manager program 122, the setup program 124, the lock program 54, and the user interface 24.

At the establishment of a new user account or of a new manager account, the user interface 24 cooperates with the administrator microprocessor 18 to retrieve or to create custom low level and secret group keys associated with the manager account used to create the new user account, or associated with the new manager account. The custom keys are stored by the database server 20 in the database 22, and are used by the administrator microprocessor 18 to accomplish the challenge-and-authenticate protocol with a key card 14 inserted into the card reader 16, based on the user account or manager account information currently entered into the user interface 24.

Referring to FIGS. 3 and 6, a flow chart A shows one embodiment of the lock access sequence 130 corresponding to events that take place between the key card 14 and the padlock 12 when a user inserts the key card into the key card opening 30 associated with the padlock.

The lock access sequence 130 begins at block A1 when the key card 14 is inserted into the padlock 12 and the key card terminals contact the padlock smart card interface 32, thereby causing the lock microprocessor 36 to exit the low power sleep mode, to activate the padlock 12, to record the current date and time in the lock activity log 60, and to instruct the lock SCEE 34 to reset the card SCEE 90. The card SCEE 90 then forwards an Answer to Reset (ATR) to the lock SCEE 34. At decision block 131, the padlock microprocessor 36 determines whether or not the ATR received from the key card 14 is valid. If the ATR from the key card 14 is valid, the lock access sequence 130 continues at block A2 wherein the lock microprocessor 36 of the padlock 12 directs the lock SCEE 34 to initiate a challenge-and-authenticate process with the card SCEE 90 of the key card 14 to open a communications channel between the lock and the key card. Otherwise, if the ATR is deemed not valid, the access attempt fails and the sequence skips to block A8 wherein the lock microprocessor 36 returns to a low power sleep mode. The current date and time recorded in the lock activity log, without a card serial number, serve to indicate a failed access attempt due to a card communication error.

In one embodiment of the lock system 10, the challenge-and-authenticate process includes the following steps:

Step 1—The padlock 12 generates a first random number, and generates a first encrypted number from the first random number using the communications key of the padlock smart card encryption engine;

Step 2—The padlock 12 transmits the first random number to the key card 14;

Step 3—The key card 14 generates a second encrypted number from the first random number, using the communications key of the key card smart card encryption engine 46;

Step 4—The key card sends the second encrypted number back to the padlock 12;

Step 5—The padlock 12 compares the first encrypted number to the second encrypted number; if a match is determined, the challenge portion is successful;

Step 6—The key card 14 generates a second random number, and generates a third encrypted number from the second random number using the secret group key of the key card smart card encryption engine;

Step 7—The key card 14 transmits the second random number to the padlock 12;

Step 8—The padlock 12 generates a fourth encrypted number from the second random number, using the secret group key of the lock smart card encryption engine, and returns the encrypted random number back to the key card 14.

Step 9—The key card 14 compares the third encrypted number to the fourth encrypted number received from the padlock 12.

Step 10—If the third and fourth encrypted numbers match, the challenge-and-authenticate process is successful and a communications channel between the key card 14 and the padlock 12 is established.

In other embodiments of the lock system 10 a different method or system may be used to authenticate the key card 14 for use with the padlock 12.

The lock access sequence 130 continues at block 132 wherein a determination is made whether or not the challenge-and-authenticate process was successful. Following a successful challenge-and-authenticate process, a communications channel is established between the padlock 12 and the key card 14 and the process continues at block A3. After the communications channel is open all communications between the key card and the lock or database shall be encrypted using the low level communications key and/or the secret group key. If the challenge-and-authenticate process fails, the lock access sequence 130 continues at block A8 wherein the lock returns to the low power sleep mode. The current date and time recorded in the lock activity log, without a card serial number, serve to indicate a failed access attempt due to a card communication error.

Referring to block A3, the lock access sequence 130 continues as the card microprocessor 92 reads the activity log key 56 from the unencrypted card memory 100, and pushes the activity log key 56 to the LMAEE 38. Similarly, the lock microprocessor 36 reads the activity log key 56 from the unencrypted lock memory 41, and pushes the activity log key 56 to the CMAEE 94. The card microprocessor 92 then reads the card header 102 from the encrypted card memory 98, and pushes the card header 102 to the lock microprocessor 36.

At block A4, the lock microprocessor 36 writes the card serial number 76 from the card header 102, and the current date and time from the clock 42, through the LMAEE 38 to the lock activity log 60 of the encrypted lock memory 43, thereby opening a lock activity record 74 that records an unsuccessful lock access attempt. At block 133, the lock microprocessor 36 compares the expiration date and time 110 from the card header 102 to the current date and time from the lock's internal clock 42.

If the expiration date and time 110 is later than the current date and time, then the lock microprocessor proceeds to block 134. Otherwise, the lock microprocessor 36 proceeds to block A8. At block 134, the lock microprocessor 36 compares the card serial number 76 from the card header 102 to each card serial number 76 listed on the black list 64 stored in the encrypted lock memory 43. If a match is found, then the lock microprocessor 36 proceeds to block A8. Optionally, the lock program 54 also can configure the card microprocessor 92 to erase the card memory 96 of a key card having a card serial number 76 identified in the black list 64. If no match is found on the black list 64, then the lock microprocessor proceeds to block A5.

At block A5, the lock microprocessor 36 instructs the card microprocessor 92 to provide further information for authorizing access by the key card 14. For example, the card microprocessor provides a card version of the black list 64 and the white list 104. The lock microprocessor 36 then compares the credential date and time 65 from the card version of the black list 64 to the credential date and time of a lock version of the black list 64 stored in the encrypted lock memory 43, thereby identifying a more recent version of the black list 64. The lock microprocessor also compares each lock serial number 70 of the white list 104 to the lock serial number 70 of the padlock 12. If a match is found, the lock microprocessor 36, performs housekeeping tasks prior to opening the lock 12. The tasks are designed to allow the key card 14 to securely shuttle lock access information between the padlock 12 and the system database 22. If a match is not made between any of the lock serial numbers 70 of the white list 104 and the lock serial number 70 of the padlock 12, the padlock 12 fails to open and the lock microprocessor 36 proceeds to block A8.

Optionally, at any of the preceding "fail" points, the card microprocessor 92 may increment the failed access attempt counter 120 and may compare the incremented counter value to the failed access threshold 118. If the incremented counter value 120 exceeds the threshold 118, the lock's microprocessor will delete the key card's white list in order to disable the key card from opening any locks within the system.

The housekeeping tasks commence at block A6, wherein the lock microprocessor 36 requests the pending delete file 108 from the card microprocessor 92. Thereafter, the lock microprocessor 36 deletes from the lock activity log 60, in the encrypted lock memory 43, entries prior to the prey delete date and time corresponding to the lock serial number 70 in the pending delete file. Further, the card microprocessor 92 marks the pending delete file 108 as to the processed files deleted from the lock activity log 60 of the padlock 12.

Also at block A6, the lock microprocessor 36 transfers the lock activity log 60 to the key card 14 and instructs the card microprocessor 92 to write the lock activity log 60 to the card activity log 106 in the encrypted card memory 98. The lock microprocessor 36 then writes the more recent version of the black list 64 through the LMAEE 38 to the encrypted lock memory 43.

Next, at block A7, the lock microprocessor 36 of the padlock 12 writes a "success" value of the ultimate action code 82 to the open lock activity record 74 in the lock activity log 60. The lock microprocessor 36 then controls the latch mechanism 46 to release the shackle 28 of the lock, thereby opening the lock.

At block A8, the lock microprocessor 36 returns to a low power sleep mode, thereby clearing the LMAEE cache memory 39, and powers down the card microprocessor 92, thereby clearing the CMAEE volatile cache memory 95. The presence or absence of the card serial number 76 in the lock activity record 74 of the lock activity log 60, along with the current date and time and the presence, absence, or value of the ultimate action code 82, record whether the access attempt succeeded or failed. Optionally, the value of the ultimate action code 82 can record a reason for a failed access attempt.

The lock access sequence 130 ends at block A9 when the user removes the key card 14 from the lock. Optionally, the capture mechanism of the lock 12 may capture the key card 14 in the card opening 30 until the shackle 28 is returned to the locked position as sensed by the position sensor 49. Optionally, the lock microprocessor 36 may write to the lock activity record 74 in the lock activity log 60 a date and time when the shackle 28 is returned to the locked position.

Credentialing of the manager cards and of the user cards is required at intervals set by the access control administrator. Configuring a plurality of cards to require phased and periodic credentialing allows lock access information to move between the locks and the system database in a timely manner without requiring dedicated data collection processes or permanently networked access control devices. During the credentialing sequence data also is transferred back to the key card 14 with an ultimate destination being the padlock 12 device on the next access attempt.

Figure 7:
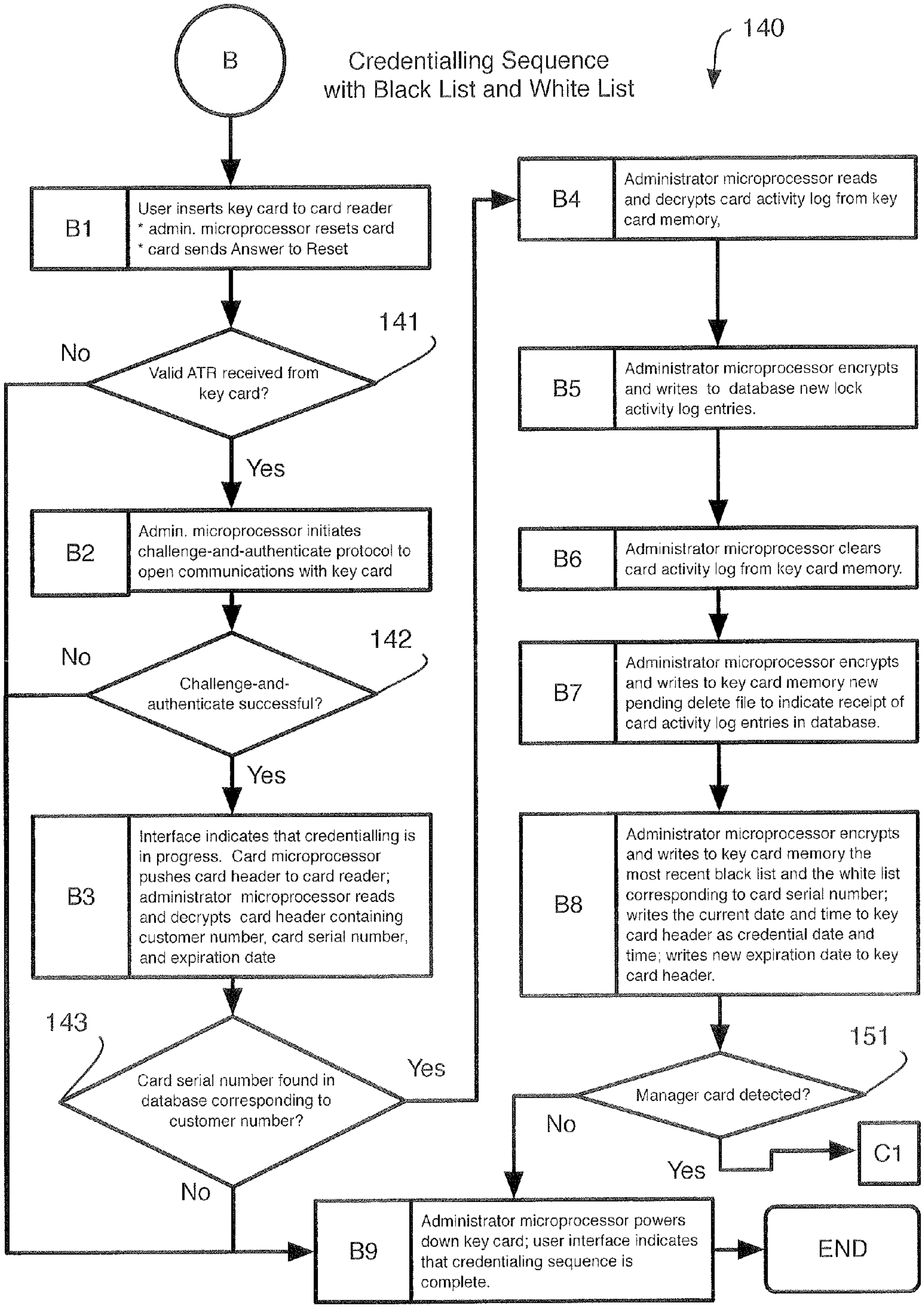
FIG. 7 is a flow chart of a credentialing sequence using the key card and card reader of FIG. 1, according to an embodiment of the present invention.

Referring to FIGS. 3 and 7, a flow chart B shows one embodiment of the credentialing sequence 140, beginning at block B1 wherein the key card 14 is inserted into the card reader 16 and thereby is coupled in communication with the system database 22, via the administrator microprocessor 18 and the database server 20. The key card 14 then forwards an Answer to Reset (ATR) to the administrator microprocessor 18.

The credentialing sequence 140 continues at decision block 141 wherein the administrator microprocessor 18 determines whether or not the ATR received from the key card 14 is valid. If the ATR is deemed not valid, the process continues at block B9 wherein the credentialing sequence is terminated and a notice of the failed credentialing is recorded in the database 22. If the ATR from the key card 14 is valid, the credentialing sequence 140 continues at block B2 wherein the administrator microprocessor 18 initiates a challenge-and-authenticate process with the key card 14 to open a communications channel with the key card 14 so as to access the data stored thereon. The challenge-and-authenticate process is similar to that set forth with reference to the padlock and key card, and is not further discussed herein.

Presuming a successful result is returned from the challenge-and-authenticate protocol at decision block 142, the credentialing sequence 140 continues to block B3 wherein the administrator microprocessor 18 instructs the card microprocessor 92 to provide the card header 102 for validation. At decision block 143, the administrator microprocessor 18 validates the key card 14 by comparing information from the card header 102 to information associated with the card serial number 76 in the database 22. If the information from the key card 14 does not match the information from the database 22, the process skips to block B9 and terminates. For example, the customer identification number 66 and the card serial number 76 from the card header 102 may be compared to the combinations of customer identification numbers and card serial numbers recorded in the database 22.

If the key card 14 is validated, the credentialing sequence 140 continues at block B4 wherein the card activity log 106 stored on the key card 14 is read and decrypted. At block B5, the system database 22 is updated to include the data retrieved from the card activity log 106. Next, at block B6 the lock activity logs 78 on the key card 14 are cleared.

Thereafter, at block B7, the credentialing sequence 140 continues by updating the pending delete file 108 on the key card 14 to identify the pre-delete dates and times corresponding to the lock serial number(s) 58 of the most recent activity log entries 38 that have been transferred from one or more lock(s) 12 to the system database 22 via any key card including the key card 14. At block B8, the expiration date and time 110 and/or the credential date and time on the key card 14 are updated to reflect the credentialing sequence and/or an associated credentialing period. Optimally, the expiration date and time 110 is calculated by the administrator microprocessor 18 based on the contents of the card activity log 106. For example, the expiration date and time 110 may be set closer to the credential date and time if the card activity log 106 occupies a substantial fraction of the encrypted memory 98, or further from the credential date and time if the card activity log 106 occupies a smaller fraction of the encrypted memory 98. Thus usage of the card memory 96 can be optimized through scheduling of the credentialing sequence.

Referring to block B9, once the activity log information 78 is transferred from the key card 14, the pending delete file 108 is updated, and the expiration date and time 110 thereof is reset, the credentialing sequence 140 ends by powering down the key card 14, thereby clearing the activity log key 56 from the CMAEE volatile cache 95.

Referring to FIGS. 4, 5, 7, and 8, a flow chart C shows the initial configuration sequence 150 as an option available from the manager instance of the user interface during the credentialing sequence for a manager card.

Following block B8 of the credentialing sequence shown in FIG. 7, the card reader 16 checks at decision block 151 (also shown in flow chart B of FIG. 7) whether the key card 14 is a manager card. For example, the card reader 16 may check for voltage supplied by the battery 44A to the power contact 89 of the key card 14. If the key card 14 is a manager card, then at block C1 the administrator microprocessor 18 directs the user interface 24 to display a prompt for entry of the manager key carrier's unique customer identification number 66. At decision block 152 the administrator microprocessor 18 compares an entered value to the customer identification number 66 present in the card header 102 of the manager card 14 inserted into the card reader 16. If the entered value matches the customer identification number 66, then the administrator microprocessor 18 directs the user interface 24 to initiate a manager instance offering managerial functions. At decision block 153, the manager key carrier chooses to configure a setup card for initializing a new lock 12. At block C3, the user interface 24 then prompts the manager to remove the manager card from the card reader 16 and to insert a blank key card 14 in the card reader 16. On detection of the blank key card by the card reader 16, the administrator microprocessor 18 interacts with the database 22 at block C4 to determine a next randomly-generated lock serial number 70, corresponding uniquely to the new padlock 12, and to determine a next randomly-generated card serial number 76, corresponding uniquely to the setup card. At block C5, the administrator microprocessor 18 then modifies the database 22 to include information associated with the lock serial number 70, including information establishing that the setup card having the card serial number 76 is authorized to access the padlock 12 having the lock serial number 70. At block C6, the administrator microprocessor 18 directs the card reader 16 to configure the key card 14 as the setup card by writing to the card memory 96 the various files discussed above with reference to the setup card configuration. At block C7, the user interface 24 prompts the manager to remove the setup card from the card reader 16, and to insert the setup card into the card opening 30 of the new lock 12. Preferably, the user interface 24 also provides a prompt for the manager to indicate when the new lock 12 has opened after insertion of the setup card into the card opening 30. When the manager indicates to the user interface 24 that the new lock 12 has opened, the user interface 24 at block C8 prompts the manager to re-insert the setup card into the card reader 16. Upon detection of the setup card by the card reader 16, the administrator processor 18 performs block C9 wherein the card activity log 106 is transferred from the setup card to the database 22. Thereafter, the database 22 indicates that a first successful access attempt has been made to the lock 12 with the lock serial number 70 by the setup card with card serial number 76. Preferably, the first successful access attempt corresponding to the lock serial number 70 must be present in the database before the administrator microprocessor 18 will add the lock serial number 70 to the white list 104 of a user card. Optionally, the user interface 24 may provide an option to reconfigure the setup card as a manager card or as a user card. At block C10, the card reader 16 powers down the setup card, ending the initial configuration sequence 150.

Figure 9:
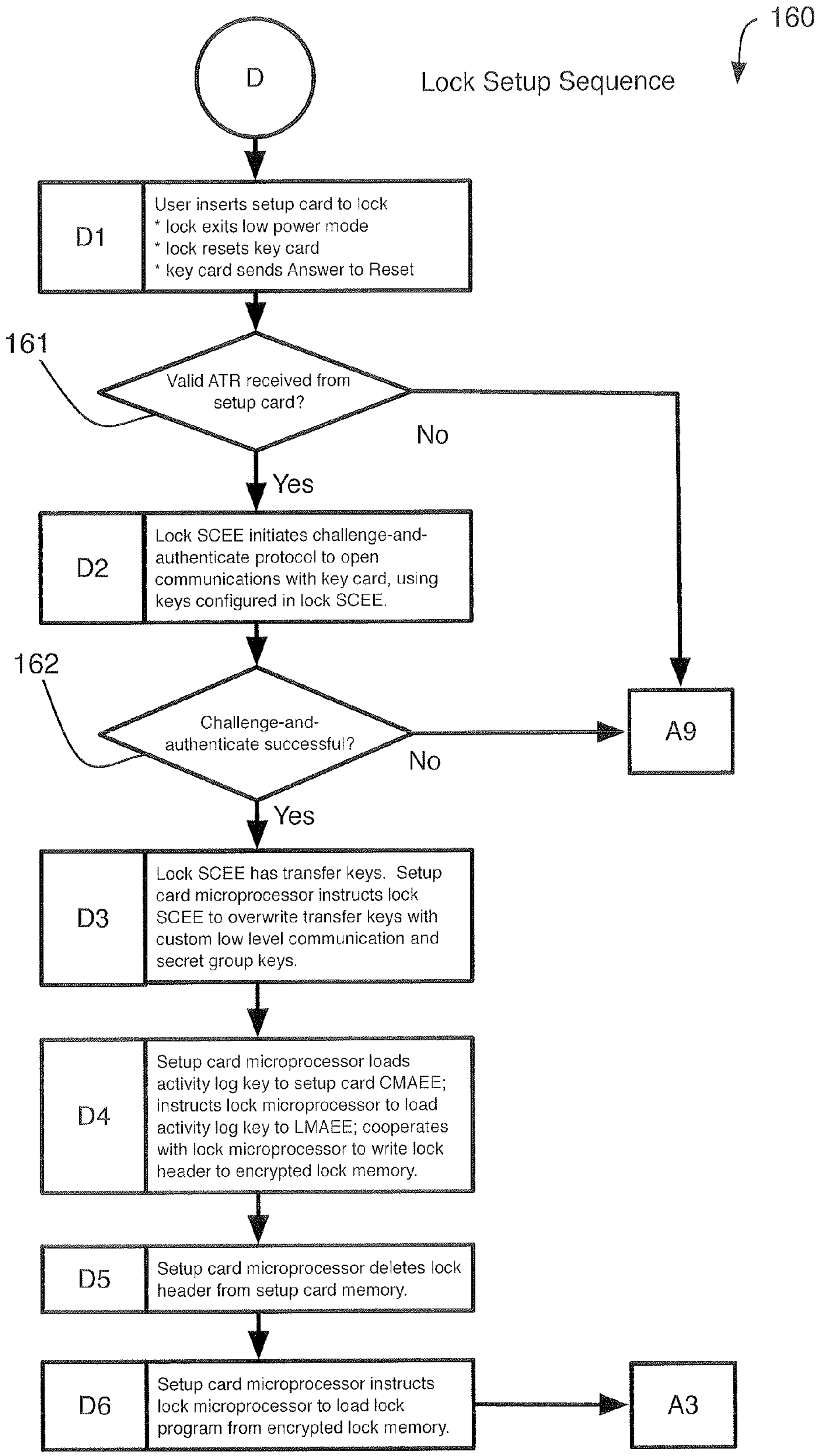
FIG. 9 is a flow chart of a lock setup sequence using the key card and the lock of FIG. 1, according to an embodiment of the present invention.

Referring to FIGS. 3, 5, and 9, a flow chart D shows a lock setup sequence 160 performed by the setup card and the new lock 12 when the setup key card 14 is inserted in the key card opening 30 of the new lock. At block D1, the new lock 12 powers on and resets the setup card 14. At power up, the setup card microprocessor 92 reads the setup program 124 from the unencrypted memory 100. Presuming that the setup card 14 provides a valid ATR at decision block 161, then at block D2, in accordance with the setup program 124, the card microprocessor 92 directs the smart card interface 88 to cooperate with the smart card interface 32 in a challenge-and-authenticate protocol, as discussed above with reference to the lock access sequence 130. If the challenge-and-authenticate protocol returns a successful result at decision block 162, then at block D3 the setup card microprocessor 92 instructs the lock SCEE 34 to overwrite the preset low level communications key (not shown) and the preset secret group key (not shown) with the custom low level communications key (not shown) and the custom secret group encryption key (not shown). At block D4, the setup card microprocessor 92 loads the activity log key 56 from the unencrypted card memory 100 to the CMAEE cache memory 95, reads the lock header 58 from the encrypted card memory 98, instructs the lock microprocessor 36 to load the activity log key 56 from the encrypted card memory 98 to the LMAEE cache memory 39, and then instructs the lock microprocessor 36 to write the lock header 58 through the LMAEE 38 to the encrypted lock memory 43. At block D5, the setup card microprocessor 92 then deletes the lock header 58 from the setup card memory 96. Accordingly, the setup card cannot subsequently be used to initialize a second blank padlock 12. At block D6, the setup card microprocessor 92, in accordance with the setup program 124, instructs the lock microprocessor 36 to load the lock program 54 from the lock memory 40, thereby configuring the lock microprocessor 36 to immediately perform the lock access sequence 130. Performing steps A3-A9 of the lock access sequence, as discussed above, writes the black list 64 to the encrypted lock memory 43, records in the lock activity log 60 and in the card activity log 106 the first successful access attempt by the setup card at the new padlock 12, and also causes the new lock 12 to open. As discussed with reference to flow chart C shown in FIG. 8, the first successful access attempt at new lock 12 preferably must be recorded in the database 22 before any white list 104 can be modified to include the lock serial number 70 corresponding to the new lock 12.

One advantage of the present invention is that the access credentials on the key card are encrypted and can be accessed only by inserting the key card into a lock or into a card reader connected to the administrator microprocessor. In particular, the access credentials on the key card can be accessed only by inserting the card into a lock configured with the same low level communications and secret group keys as configured on the card, or by inserting the card into a card reader and providing to the administrator microprocessor a user account and a password corresponding to the card.

Another advantage of the present invention is that by performing the normal operations of accessing a lock and of re-credentialing a key card, a user of the invention maintains a database of access attempts without additional administrative effort.

Another advantage of the present invention is that system information is frequently updated in locks and in a database without requiring expensive or physically cumbersome network equipment.

Yet another advantage of the present invention is that system information moves between the lock, the card, and the database in encrypted form, and is decrypted only for review via a user interface provided by the administrator microprocessor.

Yet another advantage of the present invention is that the administrator microprocessor analyzes card usage and automatically recommends a suggested re-credential threshold to ensure that card usage is adequately tracked and that system information is not lost due to card memory overflows.

Although the embodiments shown preferably use a padlock, the present invention is not limited to padlocks, but could extend to any distributed system for controlling and monitoring access to one or more secured areas. Other embodiments of the present invention include various other types of locks wherein a slideable bolt or other device replaces the shackle 28 and is similarly moveable between locked and unlocked positions.

While exemplary embodiments have been shown and described, various modifications and substitutions may be made thereto without departing from the spirit and scope of the invention. Accordingly, it is to be understood that the present invention has been described by way of illustration and not limitation. For example, each lock may have a corresponding activity log key that is stored in the card memory. As a further example, the lock access sequence may include comparison of the customer identification number stored in the card memory to the customer identification number stored in the lock memory. As yet another example, rather than each card carrying an expiration date, validation of cards may be accomplished by comparison of pass codes stored in the lock memory and in the card memory, the pass codes being updated from time to time. As another example, rather than providing microprocessors both in the lock and on the card, a single microprocessor may be provided in one of the lock and the card to control both the lock and the card. As yet a further example, rather than using an account-and-password validation for the user interface, biometric information may be collected for validation by the user interface.

In another example, a card reader that is in communication with an electronic lock and that is also in communication with the administrator database grants access to a facility while re-credentialing a user card. For example when an employee arrives at work to gain entry into the facility, the employee's user card must be inserted into the door access reader. Along with granting access to the facility the user card would be re-credentialed. In this example there would be no need for the employee to login to get the key card re-credentialed. The re-credentialing of the key card would take place without any direct interaction between the employee and the administrator database.

What is claimed is:

1. A smart lock system, comprising the combination of:

an electronic lock having a body defining a card opening, said body having disposed therein a lock microprocessor, a clock providing date and time to the lock microprocessor, an encrypted lock memory for storing encrypted information, a lock memory access encryption engine interconnecting the lock microprocessor and the encrypted lock memory and adapted to encrypt and decrypt information transferred therebetween using a first encryption key, an unencrypted lock memory in communication with the lock microprocessor for storing unencrypted information, a latch mechanism operable by the lock microprocessor to secure or release the shackle for motion relative to the body, a first card interface having internal contacts accessible via the card opening and having a power contact connected to power the lock microprocessor, the clock, and the latch mechanism, and a first card encryption engine interconnecting the lock microprocessor and the first card interface and adapted to encrypt and decrypt information transferred therebetween using a second encryption key, and a key card comprising therein a card microprocessor, a second card interface having external contacts arranged to engage the internal contacts of the electronic lock when the key card is inserted to the card opening of the electronic lock and having a power contact arranged to engage the power contact of the electronic lock and connected to power the card microprocessor, a second card encryption engine interconnecting the card microprocessor and the second card interface and adapted to encrypt and decrypt information transferred therebetween using the second encryption key, an unencrypted card memory in communication with the card microprocessor for storing unencrypted information including the first encryption key, an encrypted card memory for storing encrypted information, and a card memory access encryption engine interconnecting the card microprocessor and the encrypted card memory and adapted to encrypt and decrypt information transferred therebetween, wherein engagement of the key card with the electronic lock activates the lock and causes transfer of data between the key card encrypted memory and the electronic lock encrypted memory, thereby causing the lock to open.

2. The smart lock system according to claim 1, wherein the key card includes a card battery connected to power the second card interface so as to provide power to the card microprocessor and to the power contact of the first card interface when the key card is inserted into the card opening of the electronic lock.

3. The smart lock system according to claim 1, wherein the electronic lock includes a lock battery connected to power the first card interface so as to provide power to the lock microprocessor, to the clock, to the latch mechanism, and to the power contact of the second card interface when the key card is inserted into the card opening.

4. The smart lock system according to claim 1, wherein the latch mechanism engages a shackle adapted for securing together two objects.

5. The smart lock system according to claim 1, wherein one of the lock microprocessor and the card microprocessor is configured to actuate the latch mechanism based on a comparison of information in the encrypted card memory with information in the encrypted lock memory.

6. A smart lock system, comprising:

a plurality of electronic locks;

a card reader not in communication with any of the plurality of locks;

a plurality of key cards engageable with each of the plurality of locks, and with the card reader, for communication therebetween;

an administrator microprocessor in communication with the card reader and with a user interface via secured connections; and a database in communication with the administrator microprocessor via a secured connection or via an unsecured connection, wherein the database contains encrypted system information including, for each of the plurality of cards, card information including a corresponding list of locks accessible by the card, and for each of the plurality of locks, lock information including a corresponding list of cards not permitted to access the lock, wherein each of the plurality of cards contains encrypted card information including the corresponding list of locks accessible by the card, and encrypted lock information including for each lock in the list of locks accessible by the card the corresponding list of cards not permitted to access the lock, wherein each of the plurality of locks contains encrypted lock information including the corresponding list of cards not permitted to access the lock, wherein the encrypted lock information is encrypted by a key stored permanently only on each of the plurality of cards, and can be decrypted only by engaging one of the plurality of cards with the card reader or with one of the plurality of locks, wherein each of the plurality of cards is configured to require periodic engagement with the card reader for continued use of the card with any of the plurality of locks, wherein the card reader is configured to automatically by engaging with any of the plurality of cards update the encrypted card information and the encrypted lock information on the card and the encrypted system information in the database, wherein each card is configured to automatically by engaging with any of the plurality of locks update the encrypted lock information in the lock and on the card, and wherein only encrypted information is transferred via unsecured connections, and unencrypted information is transferred only via secured connections, such that by routine operation of the system, encrypted lock information is securely transferred between the database and each of the plurality of locks.

7. The system according to claim 6, wherein the encrypted system information further includes, for each of the plurality of locks, the corresponding list of cards not permitted to access the lock.

8. The system according to claim 6, wherein the encrypted system information further includes a list of cards not permitted to access any of the plurality of locks, and wherein the encrypted lock information contained in each of the plurality of locks includes the list of cards not permitted to access any of the plurality of locks.

9. The system according to claim 6, wherein the encrypted system information further includes a plurality of card activity logs corresponding to each of the plurality of cards, and a plurality of lock activity logs corresponding to each of the plurality of locks.

* * * * *